United States Patent
Kwon et al.

(10) Patent No.: US 9,982,541 B2
(45) Date of Patent: *May 29, 2018

(54) GAS TURBINE ENGINE FLOW PATH MEMBER

(71) Applicant: ROLLS-ROYCE NORTH AMERICAN TECHNOLOGIES, INC, Indianapolis, IN (US)

(72) Inventors: Okey Kwon, Indianapolis, IN (US); Jeffrey F. Rhodes, Zionsville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/732,153

(22) Filed: Jun. 5, 2015

(65) Prior Publication Data

US 2016/0153284 A1    Jun. 2, 2016

Related U.S. Application Data

(63) Continuation of application No. 13/335,276, filed on Dec. 22, 2011, now Pat. No. 9,085,988.

(60) Provisional application No. 61/427,132, filed on Dec. 24, 2010.

(51) Int. Cl.
*F01D 5/18* (2006.01)
*F01D 5/20* (2006.01)

(52) U.S. Cl.
CPC .............. *F01D 5/187* (2013.01); *F01D 5/20* (2013.01); *F05D 2260/201* (2013.01); *F05D 2260/202* (2013.01); *Y02T 50/673* (2013.01); *Y02T 50/676* (2013.01)

(58) Field of Classification Search
CPC . F01D 5/18; F01D 5/182; F01D 5/186; F01D 5/147; F01D 5/20; F01D 25/12
See application file for complete search history.

(56) References Cited

U.S. PATENT DOCUMENTS 3,658,439 A * 4/1972 Kydd .................. F01D 5/085
                                               416/193 R
5,261,789 A   11/1993 Butts et al.
5,626,462 A    5/1997 Jackson et al.
(Continued)

FOREIGN PATENT DOCUMENTS

DE      10201100198      7/2011
EP      1016774          7/2000
(Continued)

OTHER PUBLICATIONS

European Office Action, European Application No. 11250936.9-1610, dated Nov. 22, 2016, 4 pages.
(Continued)

*Primary Examiner* — Justin Seabe
(74) *Attorney, Agent, or Firm* — Barnes & Thornburg LLP (57) ABSTRACT

A gas turbine engine flow path member is disclosed which includes an extending end portion capable of contacting a surface of the turbine engine. The flow path member includes openings to pass a cooling fluid to cool the extending end portion. The flow path member, furthermore, can be made using a variety of approaches. To set forth just two non-limiting examples, the flow path member can be cast and it can be a laminated construction.

11 Claims, 6 Drawing Sheets

(56) References Cited

U.S. PATENT DOCUMENTS

| | | | |
|---|---|---|---|
| 5,660,523 A * | 8/1997 | Lee | F01D 5/20 415/115 |
| 6,059,530 A | 5/2000 | Lee | |
| 6,164,914 A * | 12/2000 | Correia | F01D 5/186 415/115 |
| 6,179,556 B1 | 1/2001 | Bunker | |
| 6,190,129 B1 * | 2/2001 | Mayer | F01D 5/187 416/235 |
| 6,461,107 B1 | 10/2002 | Lee et al. | |
| 6,991,430 B2 | 1/2006 | Stec et al. | |
| 7,001,151 B2 | 2/2006 | Wang et al. | |
| 7,118,342 B2 | 10/2006 | Lee et al. | |
| 7,300,251 B2 * | 11/2007 | Kitamura | F01D 5/186 416/232 |
| 7,497,660 B2 | 3/2009 | Liang | |
| 7,510,376 B2 * | 3/2009 | Lee | F01D 5/20 415/115 |
| 7,584,538 B2 | 9/2009 | Lee | |
| 7,645,123 B1 | 1/2010 | Liang | |
| 8,100,654 B1 * | 1/2012 | Liang | F01D 5/187 416/97 R |
| 8,113,779 B1 | 2/2012 | Liang | |
| 8,172,507 B2 * | 5/2012 | Liang | F01D 5/186 415/115 |
| 8,628,299 B2 | 1/2014 | Ammann et al. | |
| 2003/0021684 A1 | 1/2003 | Downs et al. | |
| 2004/0096328 A1 * | 5/2004 | Soechting | F01D 5/187 416/92 |
| 2006/0120869 A1 * | 6/2006 | Wilson | F01D 5/147 416/97 R |

FOREIGN PATENT DOCUMENTS

| | | |
|---|---|---|
| EP | 1445424 | 8/2004 |
| EP | 1762701 | 3/2007 |
| EP | 1927727 | 6/2008 |

OTHER PUBLICATIONS

Extended European Search Report, EP 11250936.9, Rolls Royce North American Technologies, Inc., dated May 27, 2014, 8 pgs.

Examiner Report for Canadian Application Serial No. 2,762,694, completed Dec. 3, 2013, (3 pages).

* cited by examiner

GAS TURBINE ENGINE FLOW PATH MEMBER

RELATED APPLICATIONS

The present application is a continuation of U.S. patent application Ser. No. 13/335,276 filed on Dec. 22, 2011 which claims the benefit of U.S. Provisional patent application 61/427,132, entitled GAS TURBINE ENGINE FLOW PATH MEMBER filed Dec. 24, 2010, each of which is incorporated herein by reference.

TECHNICAL FIELD

The present invention generally relates to gas turbine engine flow path components, and more particularly, but not exclusively, to cooled gas turbine engine blades.

BACKGROUND

Providing gas turbine engine flow path members capable of being cooled remains an area of interest. Some existing systems have various shortcomings relative to certain applications. Accordingly, there remains a need for further contributions in this area of technology.

SUMMARY

One embodiment of the present invention is a unique gas turbine engine flow path member. Other embodiments include apparatuses, systems, devices, hardware, methods, and combinations for cooling gas turbine engine flow path members. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
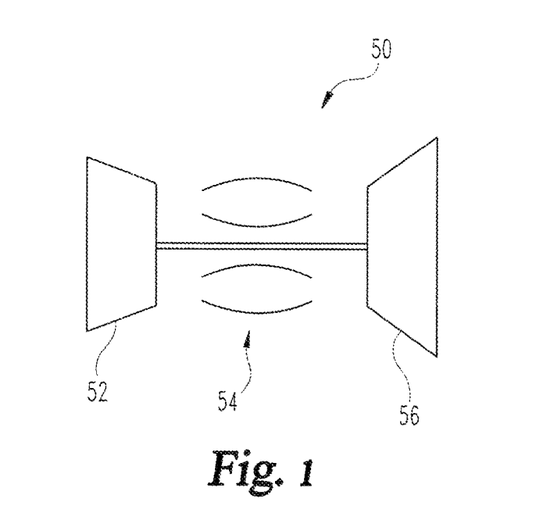
FIG. 1 depicts one embodiment of a gas turbine engine.

With reference to FIG. 1, a gas turbine engine 50 is disclosed having a compressor 52, combustor 54, and turbine 56. The gas turbine engine 50 can include a variety of flow paths and in one non-limiting form includes a flow path that traverses through the compressor 52, combustor 54, and turbine 56. The gas turbine engine 50 is depicted as a single spool turbojet engine in the illustrated embodiment but can take a variety of forms in other embodiments. To set forth just a few non-limiting examples, the gas turbine engine 50 can be a multispool engine in some forms. Additionally and/or alternatively, the gas turbine engine 50 can be a turbofan, turboshaft, or turboprop engine. In some embodiments the gas turbine engine e 50 can be an adaptive cycle and/or variable cycle engine. Furthermore, the gas turbine engine 50 can be used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Turning now to FIGS. 2 and 3a-3c, various non-limiting embodiments of a flow path member 58 are disclosed. The flow path member 58 can be disposed in any flow path in communication with the gas turbine engine 50 and in one non-limiting embodiment can be located in a turbomachinery component of the gas turbine engine 50. The member 58 can be a rotating member of the turbomachinery component such as a blade or can be a relatively stationary member such as a vane. In one non-limiting embodiment the member 58 can take the form of a rotating turbine blade.

In the illustrative embodiment the flow path member 58 can include a curved aerodynamic shape having a variety of surfaces depicted and includes a leading edge and a trailing edge. In other embodiments the flow path member 58 can take other forms. The member 58 can extend radially into the flow path of the gas turbine engine 50 and can have a variety of attributes such as sweep, stagger, and twist, to set forth just a few non-limiting examples.

The member 58 includes an extension 60 which is provided to project from an end 62 of the flow path member 58. In one non-limiting embodiment the extension 60 is a squealer that can be used to contact a surface of the gas turbine engine 50 flow path in which the flow path member 58 is disposed. The extension 60 can take a variety of forms and can project into the flow path a variety of distances.

The member 58 includes cooling openings 64 provided near the end 62 between an inner part 66 and an outer part 68 and are used to deliver a cooling fluid to influence temperatures of the member 58. In one form the cooling openings 64 are used to deliver fluid to cool the extension 60 during operation of the gas turbine engine. The extension 60 can be set back from an outer side 70 of the member 58 such as to position a discharge of the cooling openings 64 between the inner part 66 and the outer part 68. In some embodiments the extension 60 can be set back from the outer side 70 around the entire periphery of the extension 60. In further embodiments the set back can be uniform around the periphery.

Figure 2:
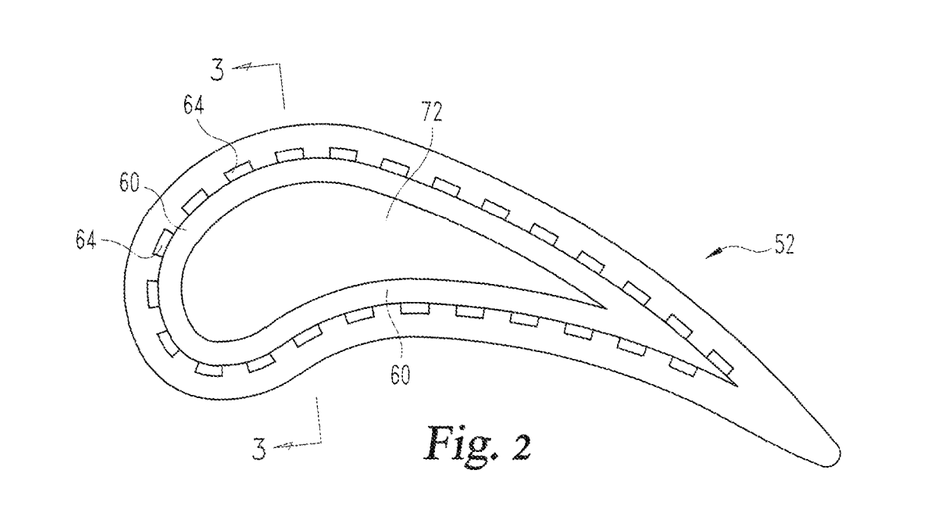
FIG. 2 depicts one embodiment of a flow path member.
Figure 3A:
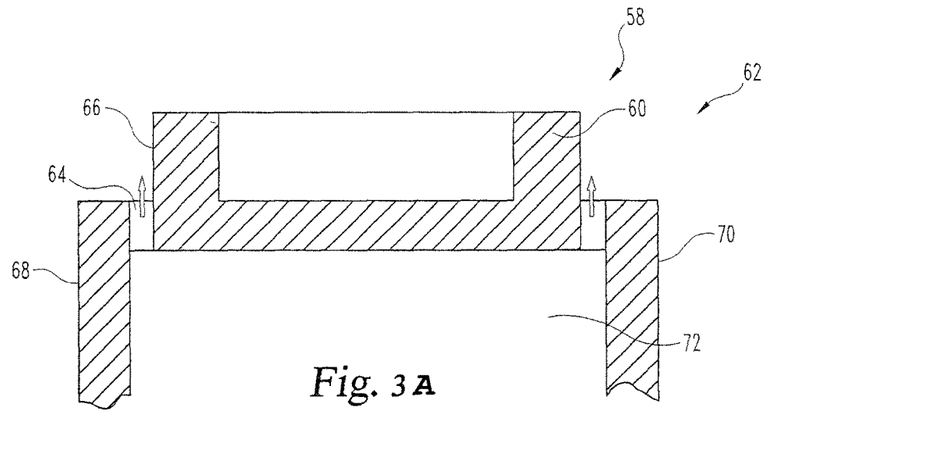
FIG. 3a depicts one embodiment of a flow path member.
Figure 3B:
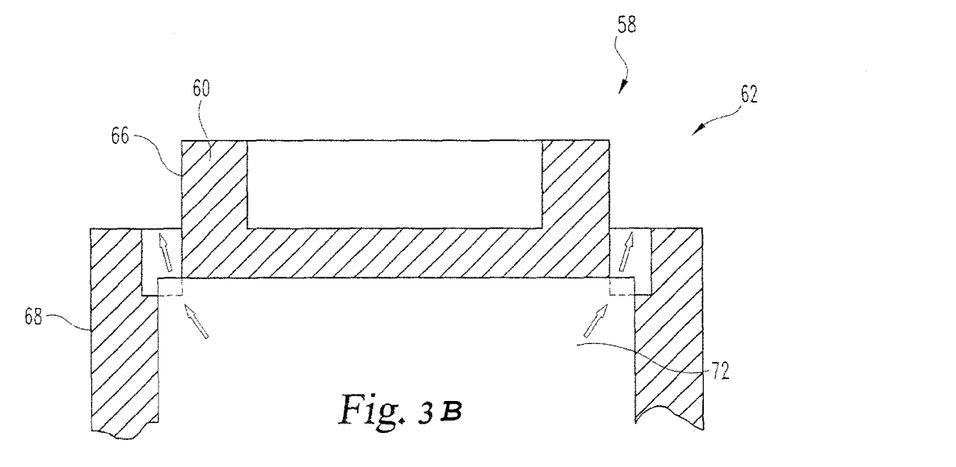
FIG. 3b depicts one embodiment of a flow path member.
Figure 3C:
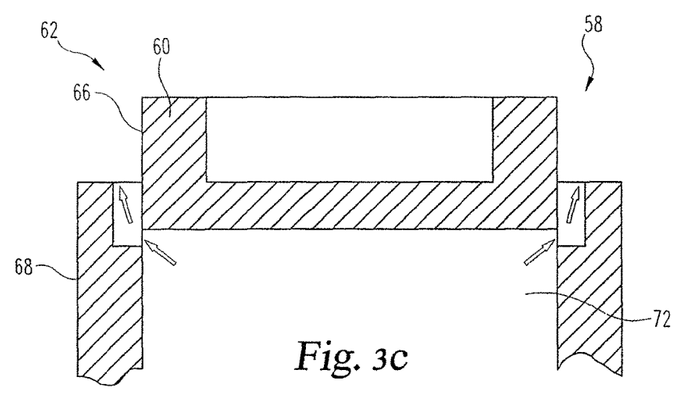
FIG. 3c depicts one embodiment of a flow path member.

The cooling openings 64 can have a variety of shapes and orientations as will be described below and can be used to flow cooling fluid from the volume 72 at a variety of rates, temperatures, and pressures. The volume 72 can receive the cooling fluid from a variety of sources such as, but not limited to, the compressor 52. As seen in FIG. 2, the cooling openings 64 can have a quadrilateral shape in some embodiments. Other embodiments may have shapes other than quadrilateral. For example, the cooling openings 64 can have an elliptical shape, or any other shapes. The openings 64 can be arranged around the member 58 and can be located near any of the pressure side, suction side, leading edge and trailing edge portions of the member 58. In one form the cooling openings 64 are provided around the leading edge, pressure side, and suction sides. The cooling holes can have a variety of configurations within the member 58. FIGS. 3a-3c which depict a portion of the member 58 along sightline 3 shown in FIG. 2 illustrate just a few non-limiting possibilities. FIG. 3a depicts the cooling openings 64 formed between the inner part 66 and outer part 68 such that the opening 64 includes a surface extending from the inner side of the outer part 68 and a surface extending from the outer side of inner part 66. FIG. 3b depicts the cooling opening 64 having a step formed in the outer part 68 and material between an outside surface of the inner part 66 and an inside surface of the outer part 68. FIG. 3c depicts the opening 64 formed in the outer part 68.

Turning now to FIGS. 4 and 5a-5c, an embodiment of the member 58 is depicted in which the member 58 includes a walled construction forming a cooling space 74 between the outer part 68 and the volume 72, and a radial dam 75 separating the cooling space 74 from the openings 64. Not all embodiments having a cooling space 74 need also have the radial dam 75. The cooling space 74 can be fed via openings 76 formed in the portion disposed between the cooling space 74 and the volume 72. The openings 76 can have a variety of shapes and sizes and can pass a fluid from the volume 74. A number of openings 76 can be provided in the member 58 and they can, but need not, be identical. The outer part 68 can, but need not, have apertures in which the fluid from the cooling space 74 is passed. Fluid can pass into the cooling space 74 and provide impingement cooling and/or transpiration cooling to the member 58.

Figure 4:
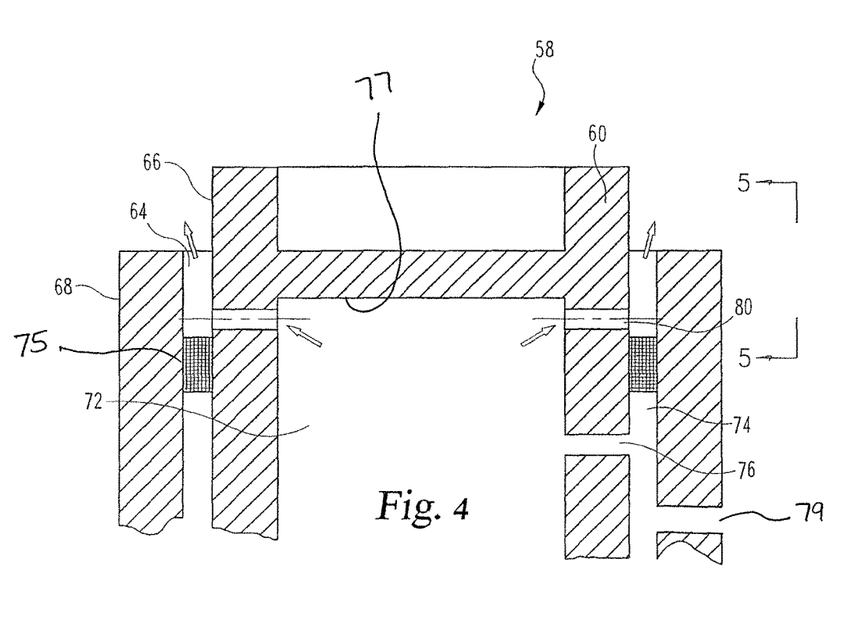
FIG. 4 depicts one embodiment of a flow path member.

The member 58 of the illustrative embodiment includes openings 80 through an inner portion of the member 58 leading to the cooling openings 64. The openings 80 can have a variety of shapes and sizes and can pass a fluid from the volume 74. A number of openings 80 can be provided in the member 58 and they can, but need not, be identical. Furthermore, the openings 80 can have different sizes and shapes than any other openings provided in the member 58.

In one form of the member 58, the inner part 66 extends radially away from an end of the member 58 to form the portion between the outer part 68 and the volume 72.

Figure 5A:
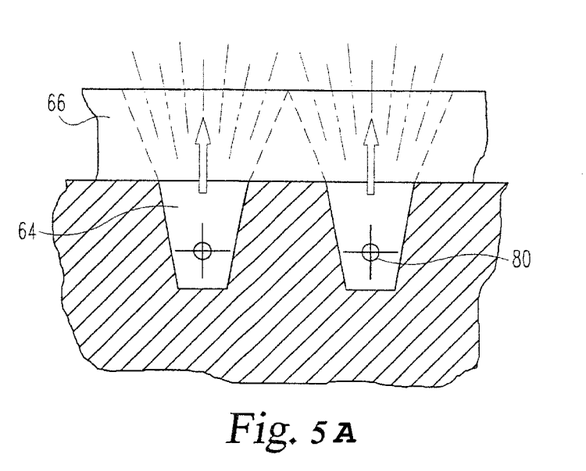
FIG. 5a depicts one embodiment of a flow path member.
Figure 5B:
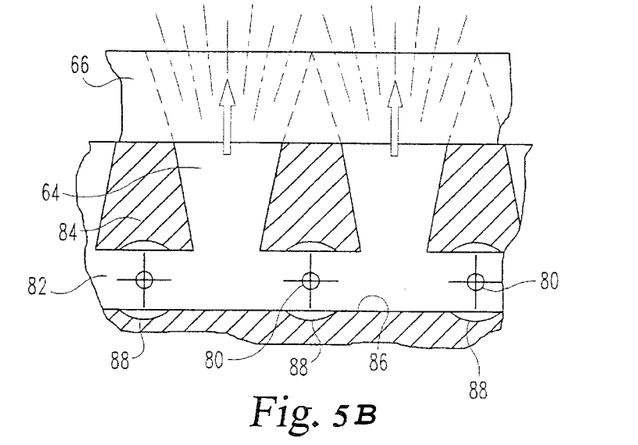
FIG. 5b depicts one embodiment of a flow path member.
Figure 5C:
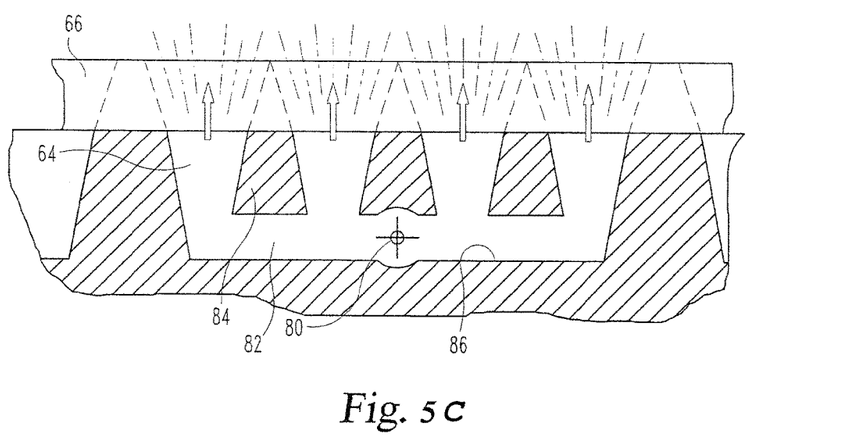
FIG. 5c depicts one embodiment of a flow path member.
Figure 6A:
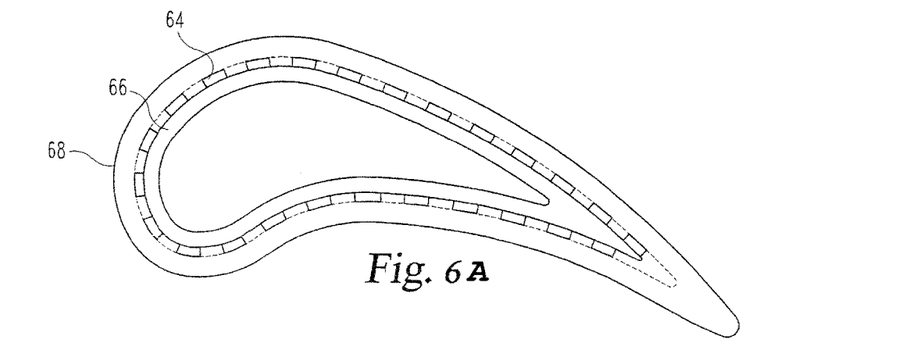
FIG. 6a depicts one embodiment of a flow path member.
Figure 6B:
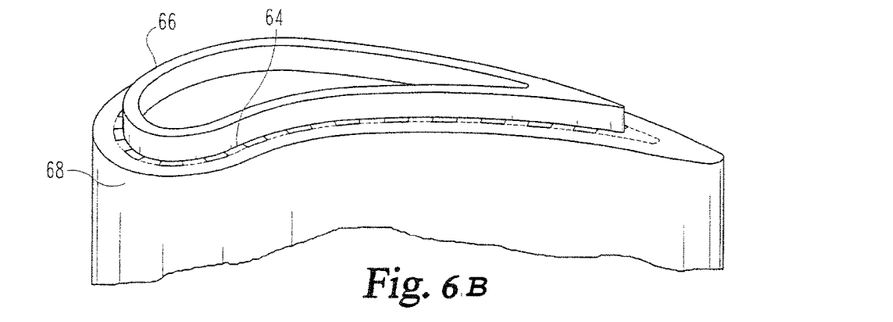
FIG. 6b depicts one embodiment of a flow path member.

The openings 80 and cooling openings 64 can have a variety of configurations within the member 58. FIGS. 5a-5c depict a portion of the member 58 along sightline 5 shown in FIG. 4 and illustrate just a few non-limiting possibilities. FIG. 5a depicts openings 80 providing fluid from the volume 72 to the cooling openings 64. The cooling openings 64 extend below the openings 80 and are shaped to increase a cross flow distance towards the discharge of the cooling openings 64. A single opening 64 is provided for each cooling opening 64. FIG. 5b depicts a number of openings 80 providing fluid to a common space 82 located between pedestals 84 and a surface 86. Recesses 88 can be provided in surface 86. FIG. 5c depicts an opening 80 providing fluid to a space 82 located between pedestals 84 and the surface 86. The fluid exits through a number of cooling openings 64. A recess 88 is also provided in this embodiment, FIGS. 6a and 6b depict an embodiment of the flow path member 58 having a laminated construction. The outer member 68 is in the form of a coversheet and the inner member 66 is in the form of a spar. Such a laminated construction can be manufactured using a variety of techniques and can additionally have a variety of features not shown in the illustrated embodiment. One non-limiting form of construction includes fastening the flow path member 58 together using brazing. The embodiment depicted in FIG. 4 could be made using a laminated construction in which the portion having the opening 76 and 80 is the spar and extends to form the extension 60. Layers other than those depicted in FIGS. 6a and 6b, as well as FIG. 4, can be provided.

Figure 7A:
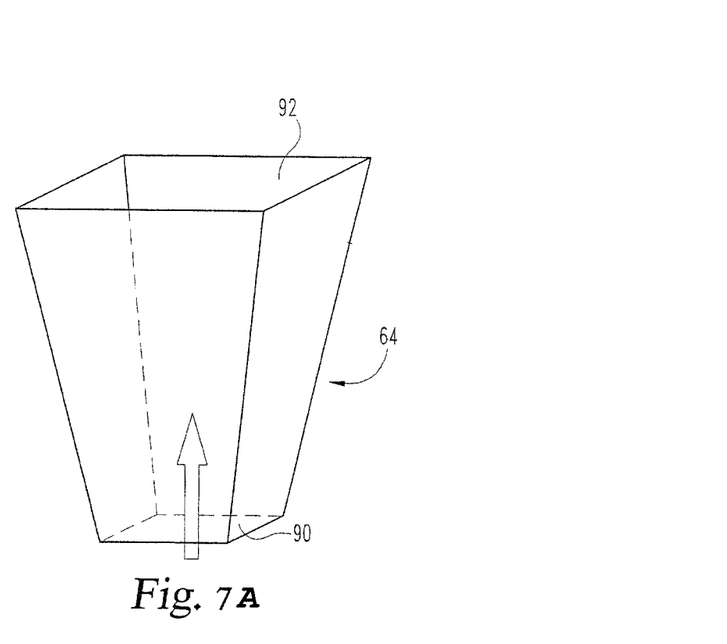
FIG. 7a depicts one embodiment of a cooling opening.
Figure 7B:
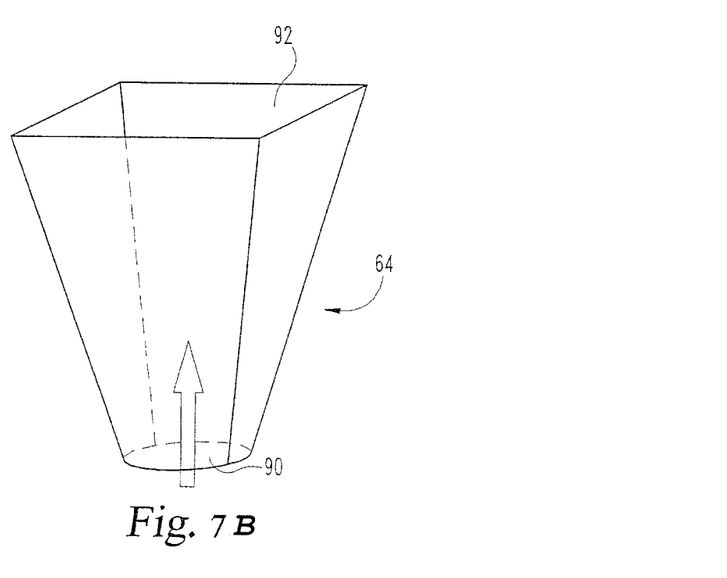
FIG. 7b depicts one embodiment of a cooling opening.

Turning now to FIGS. 7a and 7b, the cooling openings 64 can have a variety of shapes and sizes and extend from an entrance 90 to a discharge 92. For example, the cooling openings 64 can include a cross sectional area that changes along the distance of the cooling opening 64. In the two embodiments depicted, the cooling openings 64 include a cross sectional area that changes to provide a diffusion of the fluid flowing through the cooling openings 64. Not all embodiments, however, need include a diffusion of flow through cooling openings 64. The embodiment of FIG. 6a, furthermore, includes a quadrilateral shape at the entrance 90 and a quadrilateral shape at the discharge 92. The embodiment of FIG. 6b, however, includes a round shape at the entrance 90 and a quadrilateral shape at the discharge 92.

Combinations and variations of the flow path member 58, as well as any portions of the flow path member 58, are contemplated.

As will be appreciated from the above discussion, the terms inner part and outer part are used for convenience of description herein and are not meant to be limited to components separately manufactured and assembled to form the member 58. Some forms of the member 58 can be cast as a unitary whole, and others can be assembled from parts to form the member 58. Such assemblies can include, but are not limited to, laminated constructions as discussed above.

One aspect of the present application provides an apparatus comprising a gas turbine engine having a fluid cooled airfoil member disposed in a flow path and having a plurality of walls extending along a span of the member and enclosing an open interior, the walls forming a cooling passage therebetween, an inner wall of the plurality of walls extending into the flow path beyond a portion of an outer wall of the plurality of walls, and a plurality of apertures in the airfoil member having an upstream inlet and a downstream exit and operable to pass a fluid therethrough oriented to cool the inner wall that extends beyond the portion of the outer wall, wherein the downstream exits of the apertures are non-circular.

One feature of the present application provides wherein the inner wall forms a sacrificial rubbing member near the end of the airfoil member and used in case of contact with a surface of the flow path, wherein the inner wall extends radially away from the rubbing member past an end of the outer wall.

Another feature of the present application provides wherein the fluid that passes through the plurality of apertures is air withdrawn from a portion of the gas turbine engine, wherein the inner wall includes a plurality of openings which communicate the fluid to the plurality of apertures from the open interior.

Yet another feature of the present application provides wherein each of the plurality of openings are in communication with a corresponding one of the apertures of the plurality of apertures.

Still yet another feature of the present application provides wherein the plurality of apertures is oriented to pass fluid in a spanwise direction from a location between the inner wall and the outer wall, the inner wall forming a spar of the airfoil member and the outer wall forming a coversheet.

A further feature of the present application provides wherein the inner wall includes openings through which cooling fluid is passed from the open interior into the cooling passage, wherein the outer wall includes cooling holes through which the cooling fluid from the open interior is passed, and wherein the portion of the outer wall is an end of the outer wall.

A still further feature of the present application further includes a radial dam in the cooling passage to separate the cooling passage from the apertures.

Yet still a further feature of the present application provides wherein the cooling passage is formed between a base (e.g. reference numeral 77 shown in FIG. 4) of the inner member and an end of the outer member, the inner member not extending past an end of the outer member.

Another aspect of the present application provides an apparatus comprising a gas turbine engine having a rotatable turbomachinery component and a flow path through the rotatable turbomachinery component, an airflow member extending into the flow path and having a periphery, that includes a pressure side, suction side, leading edge, and trailing edge, a contact member extending from an end of the airflow member to provide a sacrificial surface in case of contact of the airflow member with a wall of the flowpath, a recess surface between the contact member and the airflow member, and a plurality of apertures located in the recess surface and oriented to pass a cooling fluid, the plurality of apertures include exits adjacent to a surface of the contact member One feature of the present application provides wherein the contact member has a shape that follows the contours of the periphery, wherein the airflow member is disposed in a turbine of the gas turbine engine, and wherein the recess extends around the pressure side, suction side, leading edge, and trailing edge.

Another feature of the present application provides wherein the plurality of apertures is arranged to pass the cooling fluid having a streamline in the radial direction.

Yet another feature of the present application provides wherein the plurality of apertures have an upstream area smaller than a downstream area.

Still yet another feature of the present application provides herein the airflow member includes a cooling pathway between an inner extending member and an outer extending member, the inner extending member forming the contact member.

A further feature of the present application provides wherein the apertures are quadrilateral in shape and are formed between the inner extending member and the outer extending member.

A still further feature of the present application provides wherein the inner extending member is a spar and the outer extending member is a coversheet, the coversheet including a plurality of openings.

Yet still a further feature of the present application further includes an air flow dam positioned in the cooling pathway, the inner extending member including openings to permit a cooling fluid from an interior of the airflow member to pass into the cooling pathway, the outer extending member including openings (e.g. reference numeral 79 in FIG. 4) to permit the cooling fluid to exit the air flow member.

Yet another aspect of the present application provides an apparatus comprising a gas turbine engine having a rotating component capable of altering a pressure of a flow stream through the rotating component, an airflow device positioned with the rotating component to pass a fluid flowing through the gas turbine engine, a rubbing tip set back from an edge of the airflow device and having a profile similar to the airflow device, and means for discharging a cooling fluid from the airflow device radially between the members.

One feature of the present application provides wherein the airflow device includes an inner radial member and an outer radial member, the inner radial member forming the rubbing tip, and which further includes means for transpiration cooling the airflow device.

Still another aspect of the present application provides a method comprising operating a gas turbine engine, conveying a working fluid through a flow path of the gas turbine engine in which the working fluid encounters an airfoil member disposed in the flow path, the airfoil member having an inner member extending along the span of the airfoil member and overhanging an end of the outer member, the inner member having an end radially away from the overhanging end and past the end of the outer member, flowing a cooling fluid from an interior of the airfoil member to a cooling space radially away from of the end of the outer member between the inner member and the outer member, and admitting a cooling fluid to the overhanging portion of the inner member via a passage from the interior of the airfoil member.

One feature of the present application provides wherein the flowing further includes encountering a radial dam disposed between the cooling space and the cooling fluid admitted to the overhanging portion.

Another feature of the present application provides wherein the airfoil member is a laminated construction.

Still another feature of the present application further includes transpiration cooling the airfoil member.

Yet still another feature of the present application provides wherein the admitting further includes diffusing the cooling fluid.

A further feature of the present application further includes impingement cooling the outer member.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A turbine blade adapted for use in a gas turbine engine, the turbine blade comprising
an airflow device having an interior volume configured to receive cooling fluid during use of the turbine blade in a gas turbine engine,
a rubbing tip set back from an edge of the airflow device, and cooling openings sized to discharge cooling fluid from the interior volume of the airflow device, the cooling openings defined at least in part by the rubbing tip and at least in part by the airflow device, and the cooling openings located around an entire periphery of the rubbing tip including a pressure side of the airflow device and a suction side of the airflow device,
wherein the airflow device includes a base located toward an end of the airflow device, the base is arranged to enclose the interior volume of the airflow device, the rubbing tip extends outwardly away from the base beyond an end of the airflow device, each cooling opening includes an entrance that opens directly into the interior volume, and the rubbing tip defines at least a portion of each of the entrances.

2. The turbine blade of claim 1, further comprising an inner member that extends the span of the airflow device and overhangs an end of the outer member to form the rubbing tip.

3. The turbine blade of claim 1, further comprising an inner member that extends the span of the airflow device to provide a spar and the outer member includes at least one coversheet fastened to the spar.

4. The turbine blade of claim 3, wherein the at least one coversheet of the outer member is fastened to the inner member by braze.

5. The turbine blade of claim 3, wherein the at least one coversheet of the outer member is formed to include apertures configured to conduct cooling fluid from the interior volume of the airflow device toward at least one of the pressure side and the suction side of the airflow device to provide transpiration cooling to the turbine blade.

6. The turbine blade of claim 3, wherein the inner member overhangs an end of the at least one coversheet included in the outer member to form at least a portion of the rubbing tip.

7. The turbine blade of claim 1, wherein the rubbing tip has a profile similar to the airflow device.

8. The turbine blade of claim 1, wherein at least one of the cooling openings is shaped to provide a diffusion of cooling fluid flowing through the at least one cooling opening.

9. The turbine blade of claim 8, wherein the at least one cooling opening includes a cross sectional area that changes along a length of the at least one cooling opening to provide diffusion of cooling fluid flowing through the at least one cooling opening.

10. The turbine blade of claim 1, wherein at least one of the cooling openings has a quadrilateral shape at its discharge.

11. The turbine blade of claim 10, wherein the at least one cooling opening has a round shape at its entrance.

* * * * *